US012799972B2

(12) United States Patent
Sakai et al.

(10) Patent No.: US 12,799,972 B2
(45) Date of Patent: Nov. 17, 2026

(54) CONNECTOR

(71) Applicant: YKK Corporation, Tokyo (JP)

(72) Inventors: Asahiko Sakai, Kurobe (JP); Kenichi Yoshie, Kurobe (JP); Naoyuki Ito, Kurobe (JP)

(73) Assignee: YKK Corporation, Tokyo (JP)

( * ) Notice: Subject to any disclaimer, the term of this patent is extended or adjusted under 35 U.S.C. 154(b) by 703 days.

(21) Appl. No.: 18/262,546

(22) PCT Filed: Jan. 29, 2021

(86) PCT No.: PCT/JP2021/003336
§ 371 (c)(1),
(2) Date: Jul. 21, 2023

(87) PCT Pub. No.: WO2022/162890
PCT Pub. Date: Aug. 4, 2022

(65) Prior Publication Data

US 2024/0077103 A1 Mar. 7, 2024

(51) Int. Cl.
*F16B 45/02* (2006.01)
*A45C 13/00* (2006.01)

(52) U.S. Cl.
CPC .............. *F16B 45/02* (2013.01); *A45C 13/00* (2013.01)

(58) Field of Classification Search
CPC ................................ F16B 45/02; A45C 13/00
See application file for complete search history.

(56) References Cited

U.S. PATENT DOCUMENTS

| | | | | | |
|---|---|---|---|---|---|
| 4,599,767 | A * | 7/1986 | Kasai | F16G 15/08 | 24/601.2 |
| 4,665,592 | A * | 5/1987 | Kasai | B29C 45/26 | 24/601.2 |
| 4,819,306 | A * | 4/1989 | Kasai | F16B 45/053 | 24/600.7 |
| 10,060,466 | B2 * | 8/2018 | Kaneko | F16B 45/036 | |

FOREIGN PATENT DOCUMENTS

| | | | |
|---|---|---|---|
| JP | S60-215117 | A | 10/1985 |
| JP | S64-014013 | U | 1/1989 |
| JP | H04-035161 | B2 | 6/1992 |
| JP | H11-131821 | A | 5/1999 |
| JP | 2000-240634 | A | 9/2000 |

OTHER PUBLICATIONS

International Search Report, PCT Patent Application No. PCT/JP2021/003336, Mar. 30, 2021, 7 pages.
Written Opinion, PCT Patent Application No. PCT/JP2021/003336, Mar. 30, 2021, 5 pages.
International Preliminary Report on Patentability, PCT Patent Application No. PCT/JP2021/003336, Jul. 31, 2023, 6 pages.

* cited by examiner

*Primary Examiner* — Thomas E Lazo
(74) *Attorney, Agent, or Firm* — Kilpatrick Townsend & Stockton LLP

(57) ABSTRACT

A connector includes a connector body and an attachment body. The connector body includes a pair of connecting holes, and the attachment body includes a connecting shaft. Connecting holes are formed in the pair of connecting hole portions, and the connecting shaft is provided with a bulge portion located in the connecting holes. Contact flat surfaces are formed in the connecting hole portions and the bulge portion, the contact flat surfaces being configured to come into surface contact with each other in a pulling direction of the connector body and the attachment body.

5 Claims, 5 Drawing Sheets

CONNECTOR

TECHNICAL FIELD

The present invention relates to a connector, such as a swivel hook, usable as a strap or a string for a bag or the like.

BACKGROUND ART

A synthetic resin swivel hook typical known includes a main body including a hook engageable with an engagement ring such as a D-shaped ring and an attachment body attachable to a strap or a string (see, Patent Literature 1).

The attachment body includes a neck extending downward from a base of the attachment body and a substantially spherical bulge portion continuous with the neck.

The main body includes a base from which the hook is continuous downward and a pair of locking bodies extending upward from the base. The locking bodies are respectively provided with circular through holes penetrating in a lateral direction. The main body is connected to the attachment body by placing the bulge portion of the attachment body in the above-described through holes and placing the neck of the attachment body between the pair of locking bodies. The main body is movable with respect to the attachment body in two directions: a rotation direction around an axis of the neck and a swing direction along a space formed between the pair of locking bodies.

CITATION LIST

Patent Literature(s)

Patent Literature 1: JP 4-35161 B

SUMMARY OF THE INVENTION

Problem(s) to be Solved by the Invention

In the above-described swivel hook including two members (the main body movable in two directions and the attachment body), an upper portion of the bulge portion of the attachment body has a flat surface formed along a direction intersecting with an axial direction of the neck, whereas upper portions of the through holes of the locking bodies of the main body respective have arc-shaped surfaces defining the through holes. In this configuration, when pulling force in an up-down direction is applied to the swivel hook, part of an edge of the flat surface of the attachment body is merely brought into contact with the arc-shaped surfaces of the main body. This makes it difficult to improve pulling resistance of the swivel hook.

An object of the invention is to provide a connector, such as a swivel hook, with improved pulling resistance.

Means for Solving the Problem(s)

A connector according to an aspect of the invention includes: a connector body and an attachment body, in which one of the connector body and the attachment body includes a pair of connecting hole portions, the other of the connector body and the attachment body includes a connecting shaft located between the pair of connecting hole portions and connected to the pair of connecting hole portions, the connector body is disposed movably in a rotation direction around an axis of the connecting shaft and a swing direction along a space between the pair of connecting hole portions, with respect to the attachment body, connecting holes are formed in the pair of connecting hole portions, the connecting shaft is provided with a bulge portion located in the connecting holes, and contact flat surfaces are formed in the connecting hole portions and the bulge portion, the contact flat surfaces being configured to come into surface contact with each other in a pulling direction of the connector body and the attachment body.

The connector according to the aspect of the invention can withstand large pulling force, because the contact flat surfaces of the connecting hole portions and the bulge portion come into surface contact with each other when pulling force is applied to the connector body and the attachment body in use of the connector.

In the connector according to the aspect of the invention, the contact flat surfaces may be configured to come into surface contact with each other continuously in a direction orthogonal to the pulling direction and along the space between the pair of connecting hole portions.

In the connector according to the aspect of the invention, the connector body may include the pair of connecting hole portions, and the attachment body may include the connecting shaft.

In the connector according to the aspect of the invention, the connecting shaft may include a shaft having an end continuous with the bulge portion, the shaft being located in the space between the connecting hole portions, and a dimension from a circumferential surface of the shaft to an end of at least a part of the contact flat surface of the bulge portion may be larger than a dimension given by subtracting a diameter of the shaft from a space dimension between the pair of connecting hole portions.

In the connector according to the aspect of the invention, the contact flat surfaces (the contact flat surfaces of the connector body) may be disposed protruding toward the contact flat surface (the contact flat surface of the attachment body) so that the contact flat surfaces (the contact flat surfaces of the connector body) are capable of being brought into surface contact with the contact flat surface (the contact flat surface of the attachment body).

In the connector according to the aspect of the invention, the pair of connecting hole portions may be provided with inclined surfaces continuous with the contact flat surfaces and exterior surfaces of the connecting hole portions.

In the connector according to the aspect of the invention, the connector body may include a hook provided on a lower side relative to the pair of connecting hole portions, the attachment body may include an attachment ring provided on an upper side relative to the connecting shaft, and the contact flat surfaces of the pair of connecting hole portions and the bulge portion may be formed within a plane along a direction orthogonal to an up-down direction.

According to the aspect of the invention, it is possible to provide a connector, such as a swivel hook, with improved pulling resistance.

DESCRIPTION OF EMBODIMENT(S)

Configuration of Exemplary Embodiment

Figure 1:
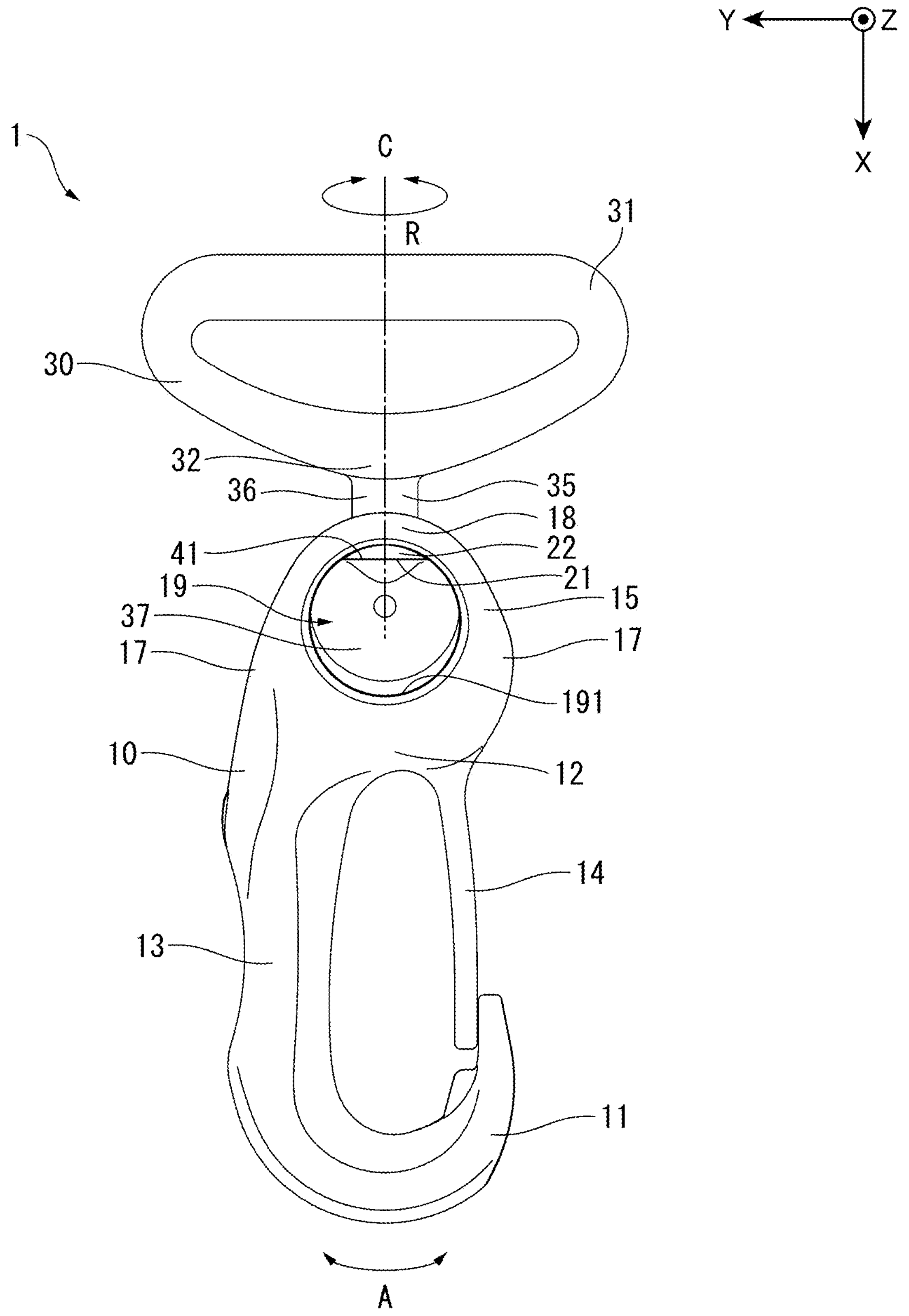
FIG. 1 is a front view of a connector according to an exemplary embodiment.
Figure 2:
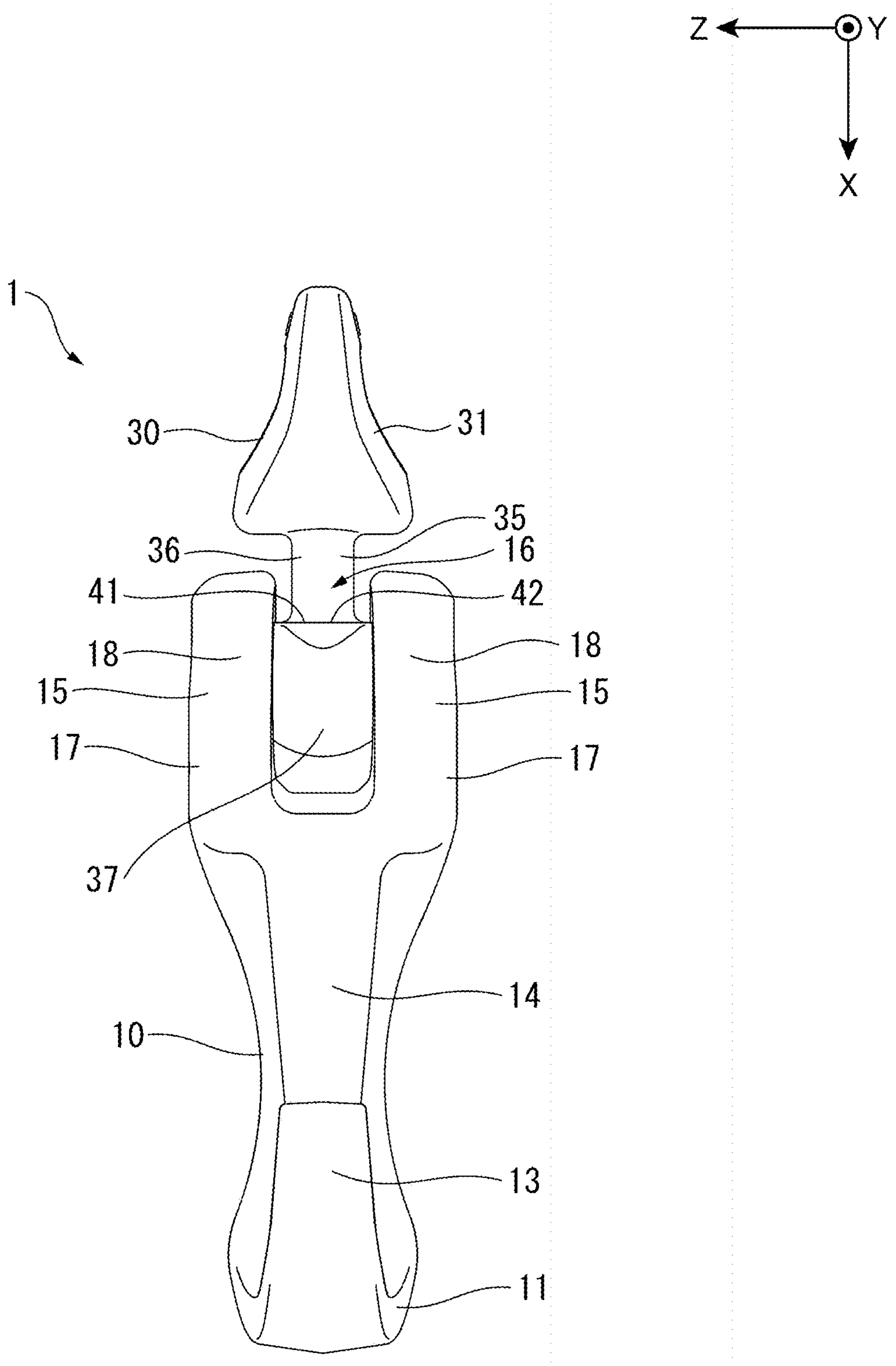
FIG. 2 is a side view of the connector according to the exemplary embodiment.

Referring to the drawings, an exemplary embodiment of the invention will be described below.

Figure 5:
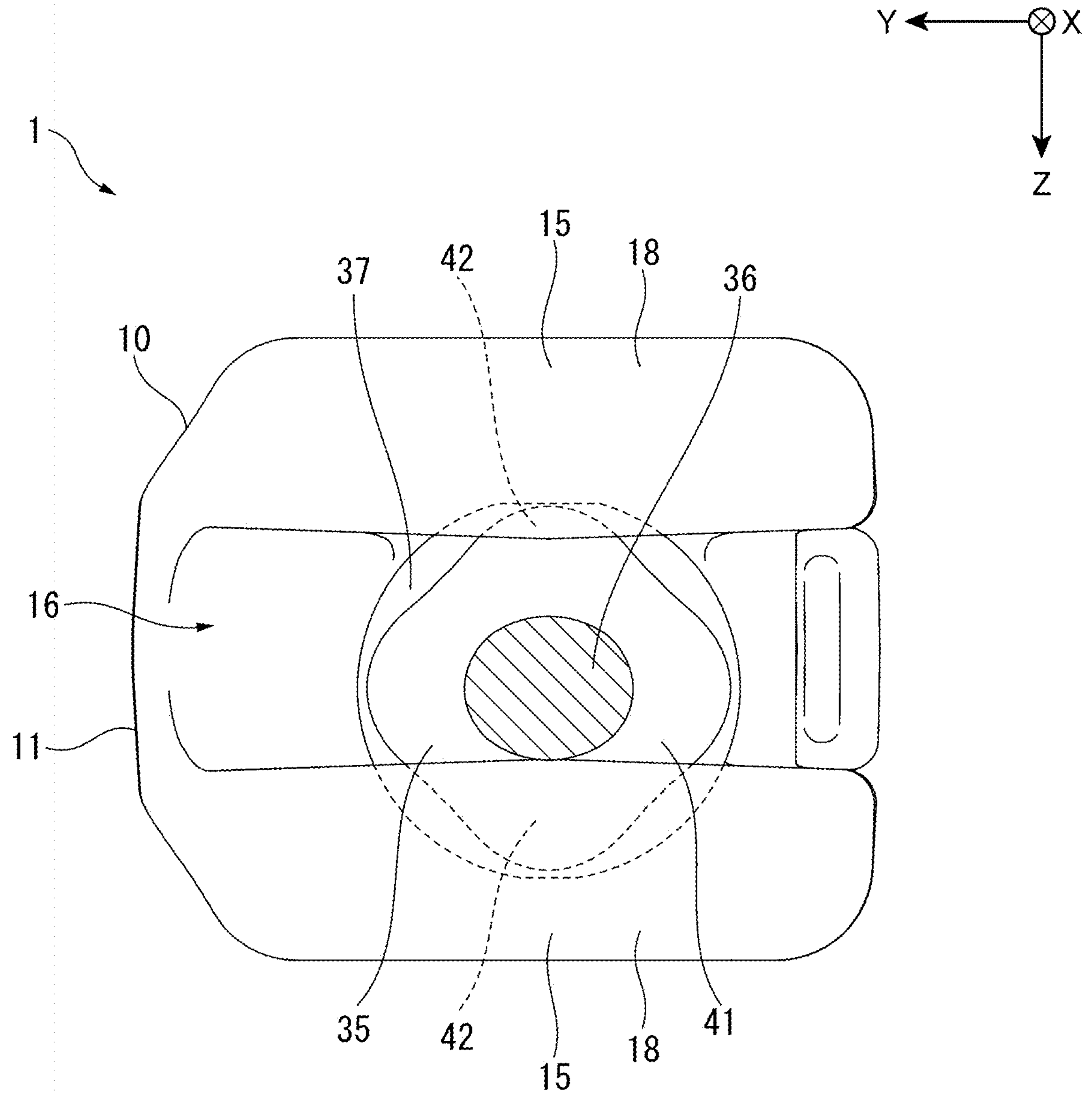
FIG. 5 is another illustration diagram of the relevant part of the connector according to the exemplary embodiment as viewed from the above.

In FIG. 1 and FIG. 5, a connector 1 according to the exemplary embodiment is usable, for instance, as a swivel hook of a shoulder bag with a shoulder strap, the swivel hook allowing the shoulder strap removably attached to the bag. The connector 1 includes a synthetic resin connector body 10 an attachment body 30.

Hereinafter, an X-axis direction is defined as an up-down direction of the connector 1, a Y-axis direction orthogonal to the X-axis direction is defined as a left-right direction of the connector 1, and a Z-axis direction orthogonal to the X- and Y-axis directions is a front-back direction (a thickness direction) of the connector 1.

The connector body 10 includes: a hook 11 on which an engagement ring, such as a D-shaped ring, attached to a bag or the like is hooked; and a pair of connecting hole portions 15, 15 provided on an upper side relative to the hook 11. The connecting hole portions 15, 15 are connected to a later-described connecting shaft 35 of the attachment body 30.

The hook 11 includes a hook piece 13 and a retaining piece 14 extending downward from a base 12 of the hook 11. The retaining piece 14 is swingable in the Y-axis direction, and the swing causes a distal end of the retaining piece 14 to abut against and separate from a distal end of the hook piece 13. The above-described engagement ring is hooked on the hook 11 by passing the engagement ring between the distal ends of the hook piece 13 and the retaining piece 14.

The connecting hole portions 15, 15 are opposed to each other in the Z-axis direction with a space 16 in between. The connecting hole portions 15, 15 are formed to have roughly the same shape. Each connecting hole portion 15 includes left and right side pieces 17, 17 extending upward from the base 12 and a contact piece 18 continuous with the side pieces 17, 17. The left and right side pieces 17, 17 are formed as a pair. The side pieces 17, 17 and the contact piece 18 form a connecting hole 19 having a circular opening 191. The connecting hole 19 penetrates in the Z-axis direction. The circular opening 191 is not necessarily in a shape of a true circle and may be in an oval shape. In the exemplary embodiment, the thickness of the contact piece 18 is increased as described later, and thus the circular opening 191 is not a perfect circle. Further, the opening of the connecting hole 19 may not be the circular opening 191, and the opening of the connecting hole 19 may have various shapes such as a polygonal shape.

Figure 3:
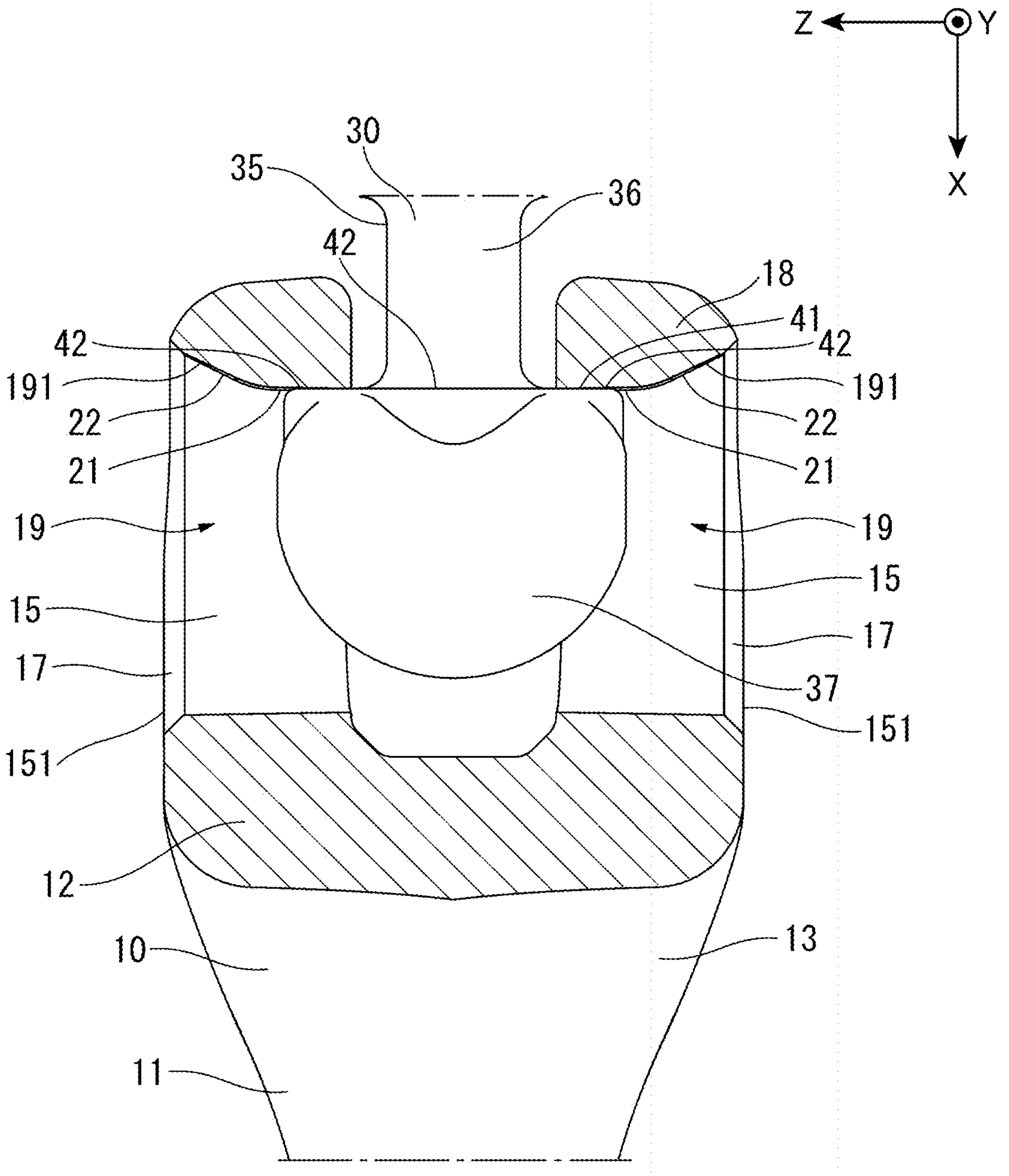
FIG. 3 is an illustration diagram of a relevant part of the connector according to the exemplary embodiment as viewed from the side.

As illustrated in FIG. 3, the contact piece 18 protrudes downward (toward a contact flat surface 41, toward the hook 11). Specifically, in the exemplary embodiment, the contact piece 18 is thicker than the side pieces 17, 17, which makes a contact flat surface 21 be disposed protruding toward the hook 11 so that the contact flat surface 21 can be brought into surface contact with the later-described contact flat surface 41. Surfaces of the contact piece 18 forming the connecting hole 19 are the contact flat surface 21 in a form of a rectangular surface along a direction orthogonal to the X-axis direction and an inclined surface 22 continuous with an outer edge in the Z-axis direction of the contact flat surface 21 and an exterior surface 151 of the connecting hole portion 15. The inclined surface 22 is inclined obliquely upward from the contact flat surface 21 toward the exterior surface 151.

The attachment body 30 includes an attachment ring 31 to which a strap, a string, or the like is to be attached and the connecting shaft 35 extending downward from a base 32 of the attachment ring 31. The connecting shaft 35 includes a shaft 36 substantially in a form of an elliptical column along the X-axis direction and continuous with the base 32 and a bulge portion 37 substantially in a form of a sphere and continuous with a lower end (end) of the shaft 36.

As illustrated in FIG. 3, a length in the X-axis direction of the shaft 36 is larger than a thickness in the X-axis direction of the contact piece 18. A dimension D in the Z-axis direction (a diameter) of the shaft 36 passing through an axial center C is smaller than a width W in the Z-axis direction (a space dimension) of the space 16. The shaft 36 is located in the space 16 between the connecting hole portions 15, 15. It should be noted that the width W is a dimension of a maximum width part of the space 16 in the exemplary embodiment.

The bulge portion 37 is located in the connecting holes 19 with upper, lower, left, and right clearances from the connecting hole portions 15, 15. An upper portion of the bulge portion 37 is provided with the contact flat surface 41 along a direction orthogonal to the X-axis direction. The contact flat surface 41 faces the contact flat surface 21 of the contact piece 18 in the X-axis direction.

Figure 4:
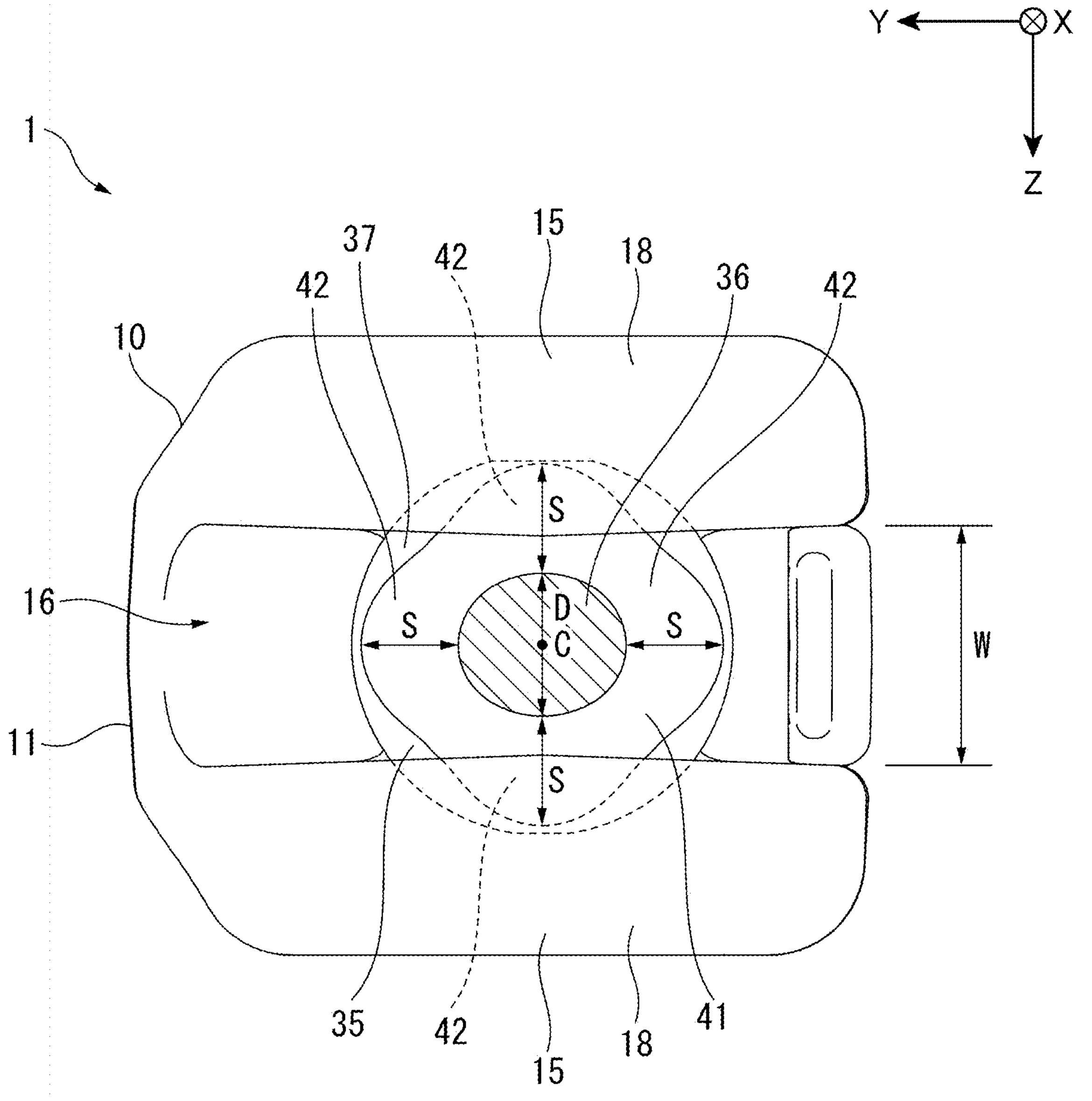
FIG. 4 is an illustration diagram of the relevant part of the connector according to the exemplary embodiment as viewed from the above.

As illustrated in FIG. 4, the contact flat surface 41, which is disposed around the shaft 36, is formed in a rounded quadrangular shape with four corners 42. A dimension between the corners 42 on a diagonal line of the contact flat surface 41 is larger than the width W of the space 16. Thus, the corners 42 on opposite sides in the Z-axis direction relative to the shaft 36 are placed on a lower side relative to the contact piece 18, facing the contact flat surfaces 21 in the X-axis direction as illustrated in FIG. 3. In this configuration, when pulling force is applied to the connector body 10 and the attachment body 30 in a pulling direction (the X-axis direction), the contact flat surface 41 is brought into surface contact with the contact flat surfaces 21 continuously in the Y-axis direction (a direction orthogonal to the X-axis direction and along the space 16 between the pair of connecting hole portions 15, 15), and this surface contact inhibits separation of the connector body 10 from the attachment body 30.

A dimension S (a dimension on a straight line passing through the axial center C) from a circumferential surface of the shaft 36 to an end of each corner 42 (protrusion) of the contact flat surface 41 is larger than a dimension given by subtracting the dimension D of the shaft 36 from the width W of the space 16. In this configuration, as illustrated, for instance, in FIG. 5, even when the shaft 36 moves in the Z-axis direction to be eccentric to one of the connecting hole portions 15, 15, the surface contact between the corners 42 on the opposite sides in the Z-axis direction relative to the shaft 36 and the contact flat surfaces 21 of the connecting hole portions 15, 15 can be maintained. Further, even when the connector body 10 rotates around an axis of the shaft 36 in a rotation direction R with respect to the attachment body 30, the corners 42 on the diagonal line of the contact flat surface 41 are kept facing the contact flat surfaces 21 of the connecting hole portions 15, 15.

As described above, the connector 1 includes two members that are the connector body 10 and the attachment body 30. The connector body 10 is disposed movably in two directions that are the rotation direction R and a swing direction A along the space 16, with respect to the attachment body 30.

Effects of Exemplary Embodiment

In the connector 1 according to the exemplary embodiment, when pulling force is applied to the connector body 10 and the attachment body 30, the contact flat surfaces 21 formed in the connecting hole portions 15, 15 are brought into surface contact with the contact flat surface 41 formed in the bulge portion 37 continuously in the Y-axis direction. This makes a contact area larger and makes force in a direction intersecting with the X-axis direction unlikely to be generated as compared with, for instance, a case where the contact flat surfaces 21 have an arc shape. It is thus possible to suitably maintain a connection state between the connecting hole portions 15, 15 and the connecting shaft 35 and improve the pulling resistance of the connector 1.

The connecting shaft 35 includes the shaft 36 having an end continuous with the bulge portion 37, the shaft 36 being located in the space 16 between the connecting hole portions 15, 15. The dimension S from the circumferential surface of the shaft 36 to an end of at least a part (the corner 42) of the contact flat surface 41 of the bulge portion 37 is larger than the dimension given by subtracting the dimension D of the shaft 36 from the width W of the space 16. In this configuration, even when the shaft 36 moves in the Z-axis direction in the space 16, the part can be brought into surface contact with the contact flat surface 21, inhibiting separation between the connector body 10 and the attachment body 30.

The contact flat surfaces 21 are disposed protruding toward the contact flat surface 41 (toward the hook 11) so that the contact flat surfaces 21 are capable of being brought into surface contact with the contact flat surface 41.

The connecting hole portions 15, 15 are provided with the inclined surfaces 22 continuous with the contact flat surfaces 21 and the exterior surfaces 151 of the connecting hole portions 15, 15. In this configuration, although the connecting hole portions 15, 15 are provided with the contact flat surfaces 21, the exterior surfaces 151 are not continuous with the contact flat surfaces 21 but continuous with the inclined surfaces 22. This allows the openings of the connecting holes 19 in the exterior surfaces 151 to be the circular openings 191 in a circular shape or even have another opening shape, providing improvement in appearance.

The contact flat surfaces 21, 41 of the connecting hole portions 15, 15 and the bulge portion 37 are formed within a plane along a direction orthogonal to the X-axis direction. This allows for providing the connector 1 in which force in a direction intersecting with the X-axis direction is unlikely to be generated even when the connector body 10 and the attachment body 30 are pulled in the X-axis direction and the contact flat surfaces 21, 41 come into pressure contact with each other.

Modifications

In the above exemplary embodiment, the connector body 10 includes the connecting hole portions 15, 15, and the attachment body 30 includes the connecting shaft 35. The invention is not limited thereto. The connector body 10 may include the connecting shaft 35 and the attachment body 30 may include the connecting hole portions 15, 15.

In the above exemplary embodiment, the contact flat surface 41 is formed in a rounded quadrangular shape with the four corners 42. The invention is not limited thereto. It is only necessary for the contact flat surface 41 to have a shape that can be brought into surface contact with the contact flat surfaces 21. The contact flat surface 41 may be in a polygonal shape different from in the above exemplary embodiment or in a circular shape.

In the above exemplary embodiment, the respective inclined surfaces 22 are formed between the contact flat surfaces 21 and the exterior surfaces 151. The inclined surfaces 22, however, may be omitted so that the contact flat surfaces 21 are continuous with the exterior surfaces 151.

In the above exemplary embodiment, the contact flat surfaces 21, 41 are formed in a direction orthogonal to the X-axis direction. The invention, however, is not limited thereto. It is only necessary for the contact flat surfaces 21, 41 to be flat surfaces that can come into surface contact with each other. The contact flat surfaces 21, 41 may thus be formed along a direction intersecting with the X-axis direction.

In the above exemplary embodiment, explanation is made about an arrangement where the connector body 10 is disposed on the lower side and the attachment body 30 is disposed on the upper side. The connector 1 in practical use is not limited thereto, and may be used upside down in some cases.

The invention claimed is:

1. A connector, comprising:
a connector body and an attachment body, wherein
one of the connector body and the attachment body comprises a pair of connecting hole portions,
the other of the connector body and the attachment body comprises a connecting shaft located between the pair of connecting hole portions and connected to the pair of connecting hole portions,
the connector body is disposed movably in a rotation direction around an axis of the connecting shaft and a swing direction along a space between the pair of connecting hole portions, with respect to the attachment body,
connecting holes, each having a circular opening, are formed in the pair of connecting hole portions,
the connecting shaft is provided with a bulge portion, the bulge portion is located in the connecting holes with upper, lower, left, and right clearances from the connecting hole portions, and a portion of the bulge portion has a substantially spherical shape,
contact flat surfaces formed in the connecting hole portions and a contact flat surface formed in the bulge portion are configured to come into surface contact with each other in a direction orthogonal to a pulling direction of the connector body and the attachment body, and along the space between the pair of connecting hole portions, and
the contact flat surfaces formed in the connecting hole portions protrude into inner portions of the connecting holes toward the contact flat surface formed in the bulge portion.

2. The connector according to claim 1, wherein
the connector body comprises the pair of connecting hole portions, and
the attachment body comprises the connecting shaft.

3. The connector according to claim 1, wherein the connecting shaft comprises a shaft having an end continuous with the bulge portion, the shaft being located in the space between the connecting hole portions, and a dimension from a circumferential surface of the shaft to an end of at least a part of the contact flat surface formed in the bulge portion is larger than a dimension given by subtracting a diameter of the shaft from a space dimension between the pair of connecting hole portions.

4. The connector according to claim 1, wherein the pair of connecting hole portions are provided with inclined surfaces continuous with the contact flat surfaces formed in the connecting hole portions and exterior surfaces of the connecting hole portions.

5. The connector according to claim 1, wherein the connector body comprises a hook provided on a lower side relative to the pair of connecting hole portions, the attachment body comprises an attachment ring provided on an upper side relative to the connecting shaft, and the contact flat surfaces formed in the pair of connecting hole portions and the contact flat surface formed in the bulge portion are formed within a plane along a direction orthogonal to an up-down direction.

* * * * *